United States Patent [19]

Matsumoto

[11] 3,869,828
[45] Mar. 11, 1975

[54] PLANTER PACKAGE

[76] Inventor: Mitsuo M. Matsumoto, P.O. Box 17852, Honolulu, Hawaii 96817

[22] Filed: July 16, 1973

[21] Appl. No.: 379,449

[52] U.S. Cl.............................. 47/34.11, 206/423
[51] Int. Cl............................................. A01g 9/02
[58] Field of Search........ 206/423, 46 PL; 47/34.11, 47/41, 29

[56] References Cited
UNITED STATES PATENTS

| | | | |
|---|---|---|---|
| 2,011,897 | 8/1935 | Hauck | 47/29 |
| 2,150,453 | 3/1939 | Mulford et al. | 47/34.11 |
| 2,341,374 | 2/1944 | Gardner | 47/34.11 X |
| 2,664,670 | 1/1954 | Mulford | 47/34.11 |
| 2,774,187 | 12/1956 | Smithers | 47/41 |
| 3,314,194 | 4/1967 | Halleck | 47/34.11 |
| 3,320,697 | 5/1967 | Larsen | 47/34.11 |
| 3,704,545 | 12/1972 | Van Reisen | 47/34.11 |

FOREIGN PATENTS OR APPLICATIONS
1,424,989  12/1965  France

*Primary Examiner*—Robert E. Bagwill
*Attorney, Agent, or Firm*—George J. Netter, Esq.

[57] ABSTRACT

A first cuplike container includes the plant with a quantity of filler materials supporting the plant to hold blossoms, leaves and the like above the container top. U-shaped bands have their open ends received onto the container top and intersect one another to form a general domelike arrangement. A thin, resilient, transparent bag of a gas permeable plastic is wrapped around the container and gathered at a point above the U-shaped bands where it is knotted or otherwise sealed. A second container, having its exterior ornamented in a desired manner and of substantially the same dimensions as the first container, is pushed onto the lower end of the first container and plastic bag.

As an alternate arrangement, a dome of a relatively rigid transparent material has a large opening therein which is received onto the upper edge of the first container including the plant. A second container with suitable ornamentation on its outer surface is pressed upon the first container as before. A plurality of small openings in the dome allow respiration gases to be dispersed.

3 Claims, 4 Drawing Figures

PATENTED MAR 11 1975  3,869,828

PLANTER PACKAGE

The present invention pertains generally to a plant container package and, more particularly, to a plant container package for temporary use during merchandising, which suitably displays the plant while at the same time protecting and preserving it.

OBJECTS AND SUMMARY OF THE INVENTION

It is a fundamental aim and object of the invention to provide an improved temporary container for a plant which is simple to use and inexpensive to fabricate.

Another object is the provision of a plant container which readily displays the plant while simultaneously protecting it from damage.

Still another object is the provision of a plant container for use during merchandising of the plant, which is easily converted to a planter.

Briefly, in the practice of this invention, a first cuplike container includes the plant with a quantity of filler material such as damp cut paper which supports the plant holding blossoms, leaves and the like above the container top. A pair of U-shaped bands have their open ends grippingly received onto the container top edge and intersect one another at a substantial angle to form a general domelike arrangement over the container top. A thin, resilient, transparent bag of a gas permeable plastic is wrapped around the first container and gathered at a point above the U-shaped bands where it is either knotted or otherwise sealed. A second cuplike container, having its exterior ornamented in a desired manner and of substantially the same dimensions as the first container, is pushed onto the lower end of the first container and plastic bag.

In use, the container package may be displayed in any desired manner, the plant remaining in full view between the U-shaped bands and with the plastic sheeting material serving both to protect the plant and also to provide for removal of respiration gases directly through the bag material. For transplanting, the second cuplike container may be simply pulled off and disposed of, the bag removed and the bands thrown away, after which the plant may be simply taken from the first container, or, if desired, the container may be used as a planter.

In a further embodiment of this invention, a single-piece domelike affair of a relatively rigid transparent material has a single opening therein which is grippingly received onto the upper edge of the first container including the plant. A second container with suitable ornamentation on its outer surface is pressed upon the first container as before. A plurality of small openings in the dome allow respiration gases to be dispersed. In replanting, the dome is simply taken off and thrown away, after which the plant can then be optionally removed for replanting or the entire set of cuplike containers may be used as a temporary (or permanent) planter, as desired.

DESCRIPTION OF A PREFERRED EMBODIMENT

Figure 1:
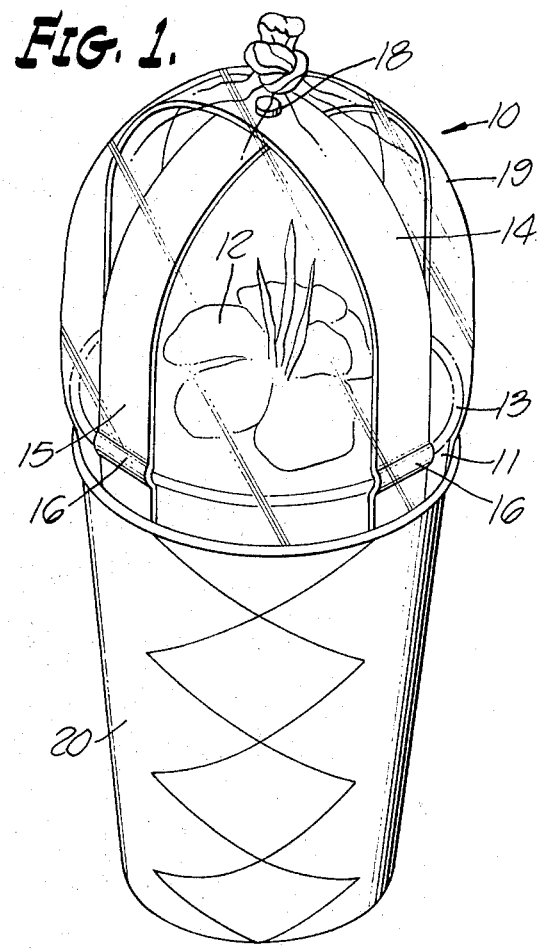
FIG. 1 is a perspective view of one form of the plant container package of this invention.
Figure 2:
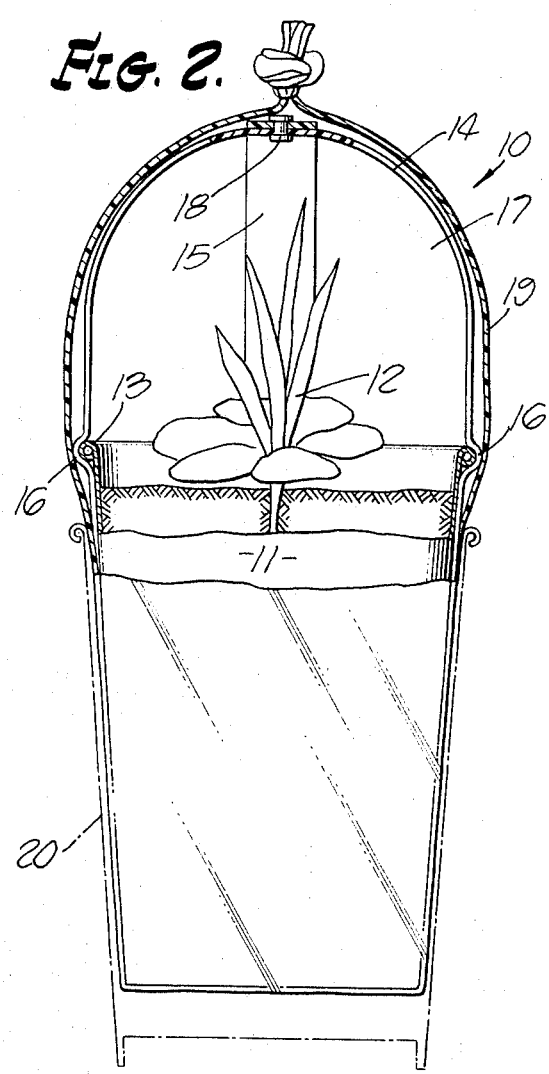
FIG. 2 is a sectional, elevational view of the plant container package of FIG. 1.

With reference now particularly to FIGS. 1 and 2, the plant container package of this invention is illustrated generally as at 10, and is seen to include a first cuplike container 11 within which a plant 12 to be displayed and packaged is received. More particularly, the container 11 is preferably constructed of paper which may be easily torn to obtain access to the plant for replanting and is in the general form of a typical paper cup having an outwardly flanged upper edge 13. For display purposes, the plant 12 should be supported within the container in such manner that the blossoms and leaves extend above the flanges.

First and second substantially identical U-shaped bands 14 and 15, each have crimped portions 16 spaced from the leg extremities thereof forming respective inwardly facing recesses. The bands 14 and 15 are of such dimensions that the open legs thereof, when received onto the container 11 grippingly receive the container flange 13 within the recesses as best shown in FIG. 2. Also, the bands are arranged at a large angle with respect to one another to form an arch or a dome over the container 11 enclosing a space 17 of sufficient dimensions to readily receive the plant leaves, blossoms and the like. A securing means 18, such as a rivet, for example, interconnects the cross portions of each of the U-shaped members together, strengthening the entire arch assembly and preventing separation of the bands from one another. The bands 14 and 15 may be of molded plastic having sufficient springlike qualities that when their ends are forced onto the container top a resilient clamping engagement results.

A thin, flexible, transparent bag 19 of a gaseously permeable plastic is received over the container 11, completely enveloping the container, plant and the bands 14 and 15. The bag is suitably secured at its upper end by knotting, heat sealing or other means. The plastic bag, being transparent, readily allows the plant to be viewed by a prospective purchaser while at the same time preventing dirt and the like from getting out of the container 11 onto a display counter top, for example. As already referenced, since the plastic bag is permeable to gases, this enables a certain amount of transfer of gases directly through the bag wall, preventing an undue collection of respiration gases inside the bag which would be deleterious to the plant growth.

The final step in the packaging is the application over the bag and lower end of the container 11 of a second cuplike container 20, the outer surface of which can be provided with a suitable ornamentation or printed matter relating to the plant, as desired. The entire assembly may then be placed on store shelves or counters at any convenient location, and the plant will be protected by the packaging construction described against damage while at the same time it is readily available for viewing and inspection by the purchaser. Also, in view of the described packaging construction, moisture is contained within the plastic bag for the use of the plant. Undue collection of respiration gases is prevented by the permeability of the plastic bag 19.

After purchase, several alternative manners of use of the container package of this invention are available to the purchaser. First, the outer container 20 and plastic bag 19 may be removed, along with bands 14 and 15, after which the plant 12 may be simply lifted from the inner container and replanted elsewhere. In certain circumstances, the easiest way of removing the plant from the container 11 may be to tear away the container and replant the entire contents.

Alternatively, the plastic bag may be merely stripped from over the bands 14 and 15, and either or both of the containers 11 and 20 used as a planter. In this latter situation, it is advisable that the plastic bag be removed in order that the plant may respire more freely, since otherwise the plant growth is somewhat stunted while confined within the bag.

Although the plant may be initially placed in the container 11 by planting it in a quantity of soil, as in a conventional flower pot, for example, since the normal retention in the container is primarily intended to be a temporary one, i.e., only during merchandising, it is preferable that the plant 12 merely have a very small amount of dirt or soil around its roots and the primary volume of the container 11 be filled with a material such as moist cut paper, for example, which will provide both the needed moisture and physical support for the plant. It has been found that cut strips of paper, suitably dampened, are excellent for this purpose.

Figure 3:
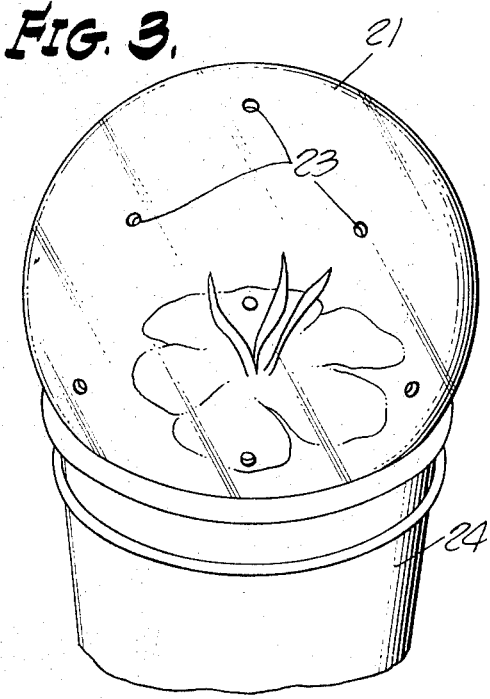
FIG. 3 is a perspective, fragmentary view in part, of a further form of the invention.
Figure 4:
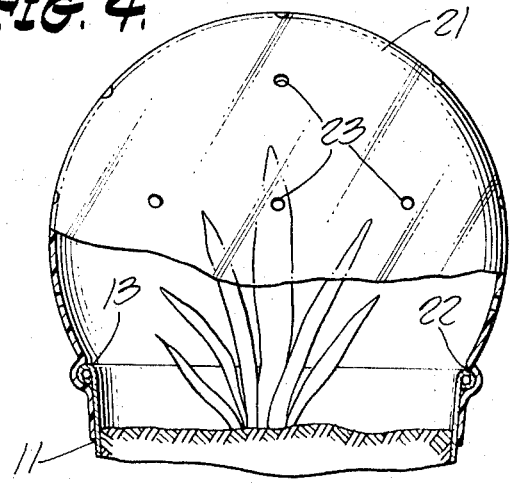
FIG. 4 is a partially sectional, elevational view of the embodiment of FIG. 3.

Turning now to FIGS. 3 and 4, there is illustrated there an alternate embodiment of the invention in which a dome or bulb shaped member 21, constructed of a relatively rigid, transparent plastic, for example, includes an opening 22 of suitable dimensions to permit receipt over the open end of the container 11. More particularly, the open end of the dome 21 includes a circumferentially extending recess on its internal surface which resiliently engages the corresponding flange 13 of the container 11 as shown best in FIG. 4. A plurality of small openings 23 are formed in the dome 21 via which respiration gases and external air are exchanged. Similar to the first described embodiment, a second or outer cuplike container 24 is slipped onto the first container and may include written indicia or any desired design or ornamentation. Use of this embodiment identical to that of the first described form. That is, the dome 21 may be simply removed and thrown away, with the remaining one or two containers utilized directly as a planter, or, after removal of the dome 21, the containers 11 and 24 may themselves be removed and the plant replanted elsewhere.

What is claimed is:

1. A plant display package, comprising:
   a first open-topped container;
   a quantity of moist paper received within said first container, said plant being disposed therein;
   removable means grippingly attached to said first container extending over the open top of said container including,
   a pair of U-shaped members intersecting one another over said first container and the open ends of which are grippingly received onto the open top of said first container; and
   flexible transparent sheetlike means constructed of plastic permeable to atmospheric gases wrapped about said first container and over said attached means, said sheetlike means being sealed sufficiently to retain moisture therewithin; and
   a second open-topped container received onto parts of said first container with said attached means extending outwardly thereof.

2. A plant display package, comprising:
   a first open-topped container;
   a quantity of moist paper received within said first container, said plant being disposed therein;
   removable means grippingly attached to said first container extending over the open top of said container including, a pair of U-shaped members intersecting one another over said first container and the open ends of which are grippingly received onto the open top of said first container, and rivet means securing said U-shaped members together in the region of intersection; and
   flexible transparent sheetlike means constructed of plastic permeable to atmospheric gases wrapped about said first container and over said attached means, said sheetlike means being sealed sufficiently to retain moisture therewithin; and
   a second open-topped container received onto parts of said first container with said attached means extending outwardly thereof.

3. A plant display package, comprising:
   a first open-topped container;
   a quantity of moist material located within said first container for receiving said plant therein;
   arched means with resilient arms grippingly engaging walls of said first container defining the open top;
   flexible transparent sheetlike means constructed of plastic permeable to atmospheric gases wrapped about said first container and over said attached means, said sheetlike means being sealed sufficiently to retain moisture therewithin; and
   a second open topped container received onto parts of said first container with said attached means extending outwardly thereof;
   said arched means and sheetlike means are removable from said first container providing use as a planter.

* * * * *